(12) United States Patent
Whittle

(10) Patent No.: US 10,711,621 B1
(45) Date of Patent: Jul. 14, 2020

(54) TURBINE VANE ASSEMBLY WITH CERAMIC MATRIX COMPOSITE COMPONENTS AND TEMPERATURE MANAGEMENT FEATURES

(71) Applicant: Rolls-Royce plc, London (GB)

(72) Inventor: Michael J. Whittle, London (GB)

(73) Assignee: Rolls-Royce plc (GB)

( * ) Notice: Subject to any disclaimer, the term of this patent is extended or adjusted under 35 U.S.C. 154(b) by 35 days.

(21) Appl. No.: 16/265,569

(22) Filed: Feb. 1, 2019

(51) Int. Cl.
  *F01D 5/18* (2006.01)
  *F01D 5/28* (2006.01)
  *F01D 9/04* (2006.01)

(52) U.S. Cl.
  CPC ............ *F01D 5/189* (2013.01); *F01D 5/284* (2013.01); *F01D 9/041* (2013.01); *F05D 2220/32* (2013.01); *F05D 2240/12* (2013.01); *F05D 2260/20* (2013.01); *F05D 2300/20* (2013.01)

(58) Field of Classification Search
  None
  See application file for complete search history.

(56) References Cited

U.S. PATENT DOCUMENTS

| | | | |
|---|---|---|---|
| 5,078,576 A | 1/1992 | Hayton | |
| 5,149,250 A | 9/1992 | Plemmons et al. | |
| 5,681,144 A | 10/1997 | Spring et al. | |
| 5,797,726 A | 8/1998 | Lee | |
| 5,833,244 A | 11/1998 | Salt et al. | |
| 6,025,078 A | 2/2000 | Richerby et al. | |
| 6,398,488 B1 | 6/2002 | Solda et al. | |
| 6,514,046 B1 | 2/2003 | Morrison et al. | |
| 6,682,299 B2 | 1/2004 | Bowen et al. | |
| 7,182,576 B2 | 2/2007 | Bunker et al. | |
| 7,625,170 B2 * | 12/2009 | Greene | F01D 5/147 415/110 |
| 7,648,334 B2 | 1/2010 | Hurst et al. | |
| 8,216,687 B2 | 7/2012 | Burd et al. | |
| 8,740,554 B2 | 6/2014 | Virkler et al. | |
| 9,297,267 B2 | 3/2016 | Itzel et al. | |
| 9,353,643 B2 | 5/2016 | Major | |
| 9,527,262 B2 | 12/2016 | Zhang et al. | |
| 9,540,940 B2 | 1/2017 | Liotta et al. | |
| 9,638,057 B2 | 5/2017 | Kwon | |
| 9,677,167 B2 | 6/2017 | Bochiechio | |
| 9,719,363 B2 | 8/2017 | Pack et al. | |
| 9,915,151 B2 | 3/2018 | Weaver et al. | |
| 9,920,417 B2 | 3/2018 | Porob et al. | |
| 10,309,240 B2 * | 6/2019 | Heitman | F01D 25/243 |
| 2008/0112804 A1 * | 5/2008 | Bhate | F01D 5/284 415/209.3 |
| 2008/0279679 A1 * | 11/2008 | Morrison | F01D 9/042 415/191 |
| 2010/0047615 A1 | 2/2010 | Carter et al. | |
| 2010/0068034 A1 * | 3/2010 | Schiavo | F01D 5/189 415/115 |
| 2010/0247329 A1 | 9/2010 | Morgan | |
| 2013/0052030 A1 * | 2/2013 | McCaffrey | B29C 70/00 416/241 B |

(Continued)

*Primary Examiner* — Michael Lebentritt
(74) *Attorney, Agent, or Firm* — Barnes & Thornburg LLP

(57) ABSTRACT

A turbine vane assembly adapted for use in a gas turbine engine includes a support and a turbine vane arranged around the support. The support is made of metallic materials. The turbine vane is made of ceramic matrix composite materials to insulate the metallic materials of the support.

20 Claims, 3 Drawing Sheets

(56) References Cited

U.S. PATENT DOCUMENTS

| | | | |
|---|---|---|---|
| 2014/0248157 A1* | 9/2014 | Ahmad | F01D 5/147 |
| | | | 416/241 R |
| 2015/0322804 A1* | 11/2015 | Butler | C23C 28/3455 |
| | | | 416/241 B |
| 2015/0322818 A1* | 11/2015 | Hannam | C23C 14/22 |
| | | | 415/177 |
| 2016/0040281 A1 | 2/2016 | Trubelja et al. | |
| 2017/0096902 A1* | 4/2017 | Novovic | C23C 14/028 |
| 2017/0211395 A1 | 7/2017 | Heffernan et al. | |
| 2019/0390558 A1* | 12/2019 | Sippel | F01D 9/065 |
| 2020/0025025 A1* | 1/2020 | Sippel | F01D 25/12 |
| 2020/0080429 A1* | 3/2020 | Vetters | F01D 25/005 |
| 2020/0080434 A1* | 3/2020 | Thomas | F01D 9/042 |

* cited by examiner

TURBINE VANE ASSEMBLY WITH CERAMIC MATRIX COMPOSITE COMPONENTS AND TEMPERATURE MANAGEMENT FEATURES

FIELD OF THE DISCLOSURE

The present disclosure relates generally to vane assemblies for gas turbine engines, and more specifically to vanes that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over aerofoils included in stationary vanes and rotating blades of the turbine. The interaction of combustion products with the aerofoils heats the aerofoils to temperatures that require the aerofoils to be made from high-temperature resistant materials and/or to be actively cooled by supplying relatively cool air to the vanes and blades. To this end, some aerofoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine vane assembly for a gas turbine engine may include a ceramic matrix composite vane and a metallic support strut. The ceramic matrix composite vane may be adapted to conduct hot gases flowing through a primary gas path of the gas turbine engine around the turbine vane assembly during use of the turbine vane assembly. The metallic support strut may be configured to receive force loads applied to the ceramic matrix composite vane by the hot gases during use of the turbine vane assembly.

In some embodiments, the ceramic matrix composite vane may include an outer wall, an inner wall, and an aerofoil. The outer wall may define an outer boundary of the primary gas path. The inner wall may be spaced apart radially from the outer wall relative to an axis to define an inner boundary of the primary gas path. The aerofoil may extend radially between and interconnect the outer wall and the inner wall. The aerofoil may be formed to define an interior cavity that extends radially into the aerofoil.

In some embodiments, the metallic support strut may be located in the interior cavity formed in the aerofoil. The metallic support strut may be spaced apart from the aerofoil at all locations radially between the outer boundary and the inner boundary of the primary gas path to define a cooling channel between the metallic support strut and the aerofoil.

In some embodiments, the cooling channel may be filled entirely by fluid radially between the outer boundary and the inner boundary.

In some embodiments, the metallic support strut may have an outermost surface that faces the aerofoil and extends radially between the inner boundary and the outer boundary of the primary gas path in the cooing channel. The outermost surface may have a surface roughness of about 6.3 µm Ra or less to provide the metallic support strut with a reflectivity to reduce an amount of radiant and convective heat transfer to the metallic support strut from the ceramic matrix composite vane caused by a temperature difference between the ceramic matrix composite vane and the metallic support strut during use of the turbine vane assembly.

In some embodiments, the metallic support strut may further include a spar and a load transfer tab. The spar may extend radially into the interior cavity. The load transfer tab may extend circumferentially away from the spar and may engage the aerofoil to receive the force loads applied to the ceramic matrix composite vane by the hot gases during use of the turbine vane assembly.

In some embodiments, the load transfer tab may be located radially outward of the outer boundary. In some embodiments, the load transfer tab may be located radially inward of the inner boundary.

In some embodiments, the outermost surface of the metallic support strut may have a first surface roughness radially between the outer boundary and the inner boundary and a second surface roughness radially outward of the outer boundary. The second surface roughness may be different than the first surface roughness. In some embodiments, the outermost surface of the metallic support strut may be continuous and formed without holes.

In some embodiments, the surface roughness of the outermost surface of the metallic support strut may be about 2 µm Ra or less radially outward beyond the outer boundary and radially inward beyond the inner boundary. In some embodiments, the surface roughness of the outermost surface may be about 1.6 µm Ra or less.

In some embodiments, the metallic support strut may include a spar and a coating layer applied to the spar. The coating layer may form the outermost surface.

According to an aspect of the present disclosure, a turbine vane assembly for a gas turbine engine may include a vane and a support strut. The vane may extend radially relative to an axis and may be formed to define an interior cavity therein. The support strut may be located in the interior cavity and at least a portion of the support strut may be spaced apart from the vane to define a radially extending cooling channel between the support strut and the vane.

In some embodiments, the support strut may have an outermost surface located in the cooling channel. The outermost surface may be spaced apart from and may face the vane. In some embodiments, at least a portion of the outermost surface may have a surface roughness of about 6.3 µm Ra or less.

In some embodiments, the outermost surface of the support strut may be continuous and formed without holes that extend through the outermost surface of the support strut. In some embodiments, the the support strut and the outermost surface may be formed as a single, integral, one-piece component.

In some embodiments, the support strut may include a spar and a coating layer applied to the spar. The coating layer may form the outermost surface.

In some embodiments, the vane may include an outer wall, an inner wall, and an aerofoil. The outer wall may have a radial inner surface. The inner wall may have a radial outer surface. The aerofoil may extend radially between and interconnect the outer wall and the inner wall.

In some embodiments, the outer wall may define a radial outer boundary of a gas path and the inner wall may define a radial inner boundary of the gas path. The outermost surface of the support strut may have a first surface roughness radially between the radial outer boundary and the radial inner boundary and a second surface roughness radially inward of the radial inner boundary. In some embodiments, the second surface roughness may be different than the first surface roughness. In some embodiments, the outermost surface of the support strut may be continuous and formed without holes that extend through the outermost surface of the support strut.

In some embodiments, the outer wall may define a radial outer boundary of a gas path and the inner wall may define a radial inner boundary of the gas path. The cooling channel may be filled entirely by fluid radially between the radial outer boundary and the radial inner boundary.

According to an aspect of the present disclosure, a method may include several steps. The method may include providing a metallic support strut and a ceramic matrix composite aerofoil formed to define an interior cavity therein, machining the metallic support strut so that at least a portion of an outermost surface of the metallic support strut has a surface roughness of about 6.3 μm Ra or less to increase surface reflectivity of the at least the portion of the outermost surface of the metallic support strut, and locating the metallic support strut in the interior cavity of the ceramic matrix composite aerofoil so that the at least the portion of the outermost surface of the metallic support strut is spaced apart from the ceramic matrix composite aerofoil to define a cooling channel therebetween.

In some embodiments, the method may include applying a coating to the metallic support strut to provide the outermost surface before the machining step. The machining step may include one of polishing, grinding, and cutting the metallic support strut.

These and other features of the present disclosure will become more apparent from the following description of the illustrative embodiments.

DETAILED DESCRIPTION OF THE DRAWINGS

Figure 1:
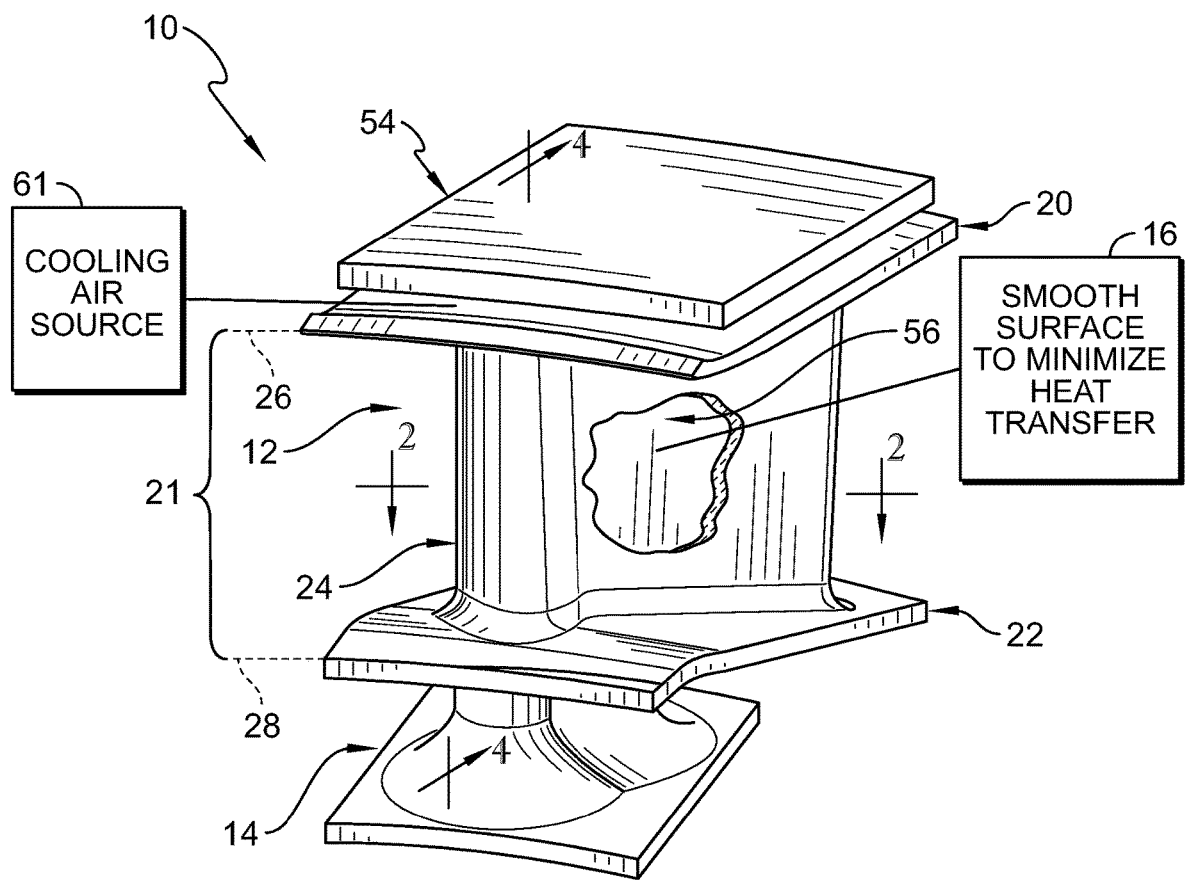
FIG. 1 is a perspective view of a turbine vane assembly in accordance with the present disclosure for use in a gas turbine engine with portions broken away to reveal that the turbine vane assembly includes a turbine vane adapted to interact with hot gases and a support strut located within the turbine vane and suggesting that the support strut has a smooth outermost surface that faces the turbine vane to reduce radiant and convective heat transfer from the turbine vane to the support strut during use of the turbine vane assembly.

For the purposes of promoting an understanding of the principles of the disclosure, reference will now be made to a number of illustrative embodiments illustrated in the drawings and specific language will be used to describe the same.

An illustrative turbine vane assembly 10 for use in a gas turbine engine is shown in FIG. 1. The turbine vane assembly 10 includes a vane 12 and a support strut 14 as shown in FIGS. 1-4. The vane 12 is adapted to conduct hot gases flowing through a primary gas path 21 of the gas turbine engine around the turbine vane assembly 10 during use of the turbine vane assembly 10. The support strut 14 is located in an interior cavity 30 of the vane 12 and is configured to receive force loads applied to the vane 12 by the hot gases during use of the turbine vane assembly 10. The support strut 14 has a continuous outermost surface 16 that faces the turbine vane 12 and extends radially between an outer boundary 26 and an inner boundary 28 of the primary gas path 21 in a cooling channel 62 formed between the vane 12 and the strut 14.

Figures 2, 3:
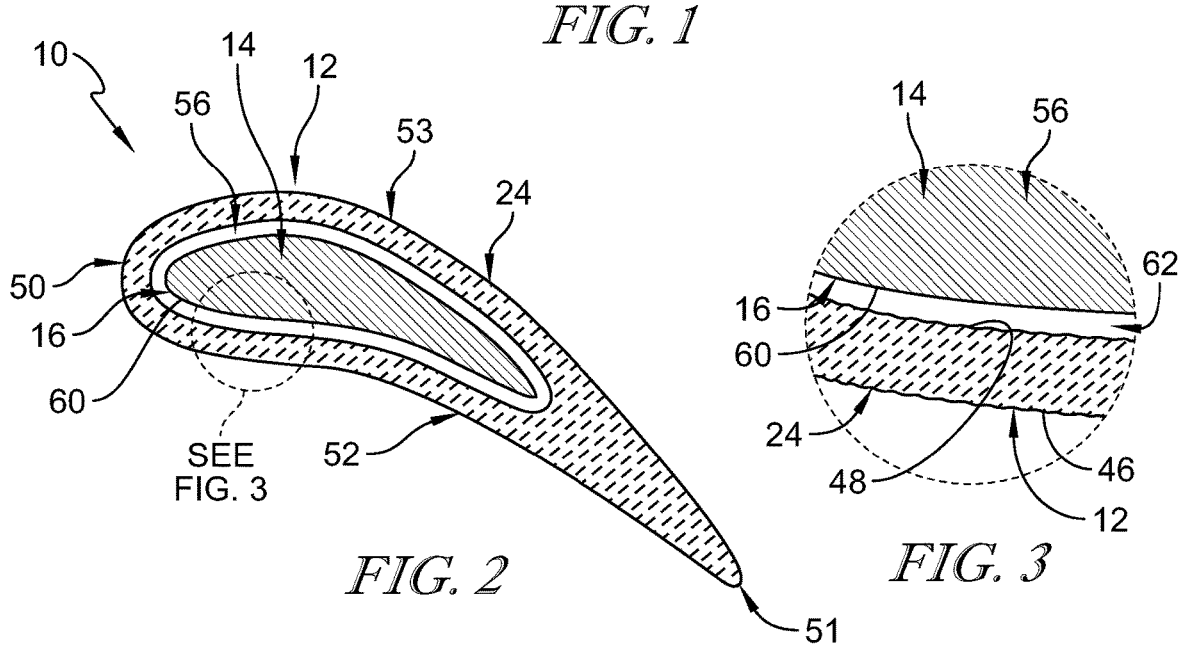
FIG. 2 is a cross sectional view of the turbine vane assembly of FIG. 1 taken along line 2-2 showing that the turbine vane comprises ceramic matrix composite materials, that the support strut comprises metallic materials, and that the outermost surface of the strut is spaced apart from the turbine vane at all locations in a primary gas path to insulate the support strut from high temperatures of the turbine vane.
FIG. 3 is a detail view of the turbine vane assembly of FIG. 2 suggesting that the outermost surface of the support strut has a low surface roughness value to increase the reflectivity of the outermost surface and reduce the heat transfer coefficient to reduce the radiant and convective heat transferred to the support strut from the turbine vane during use of the turbine vane assembly.

Illustratively, the outermost surface 16 of the support strut 14 is spaced apart from the vane 12 and has a relatively low surface roughness 60 to insulate the support strut 14 from the heat of the ceramic matrix composite vane 12 as suggested in FIG. 3. The low surface roughness of the outermost surface 16 increases the reflectivity of the outermost surface 16 of the support strut 14 and reduces the heat transfer coefficient to reduce an amount of radiant and convective heat transfer to the support strut 14 from the vane 12 caused by a temperature difference between the vane 12 and the support strut 14 during use of the assembly 10. As suggested in FIG. 3, the outermost surface 16 is relatively smooth and the vane 12 has surfaces 46, 48 that are relatively rough. The outermost surface 16 is also smooth relative to surfaces of metallic or non-metallic support struts in typical vane assemblies.

In some embodiments, the surfaces 46, 48 may also be smooth relative to surfaces of ceramic matrix composite vanes in typical vane assemblies. For example, the surfaces 46, 48 may have a surface roughness of about 2 micron Ra or less. In other embodiments, the cooling channel 62 may have an increased thickness to space the surfaces 46, 48 further from the outermost surface 16 of the spar 56.

In other embodiments, an additional piece of material may be located in the cooling channel 62 around the outermost surface 16 of the spar 56. For example, the additional piece of material may be an impingement tube to shield the spar from coolant in the cooling channel 62.

The vane 12 comprises ceramic matrix materials while the support strut 14 comprises metallic materials in the illustrative embodiment. The ceramic matrix composite vane 12 is adapted to withstand high temperatures, but may have relatively low strength compared to the metallic support strut 14. The support strut 14 provides structural strength to the turbine vane assembly 10 by receiving the force loads applied to the vane 12. The support strut 14 may not be capable of withstanding the high temperatures experienced by the ceramic matrix composite vane 12.

Figure 4:
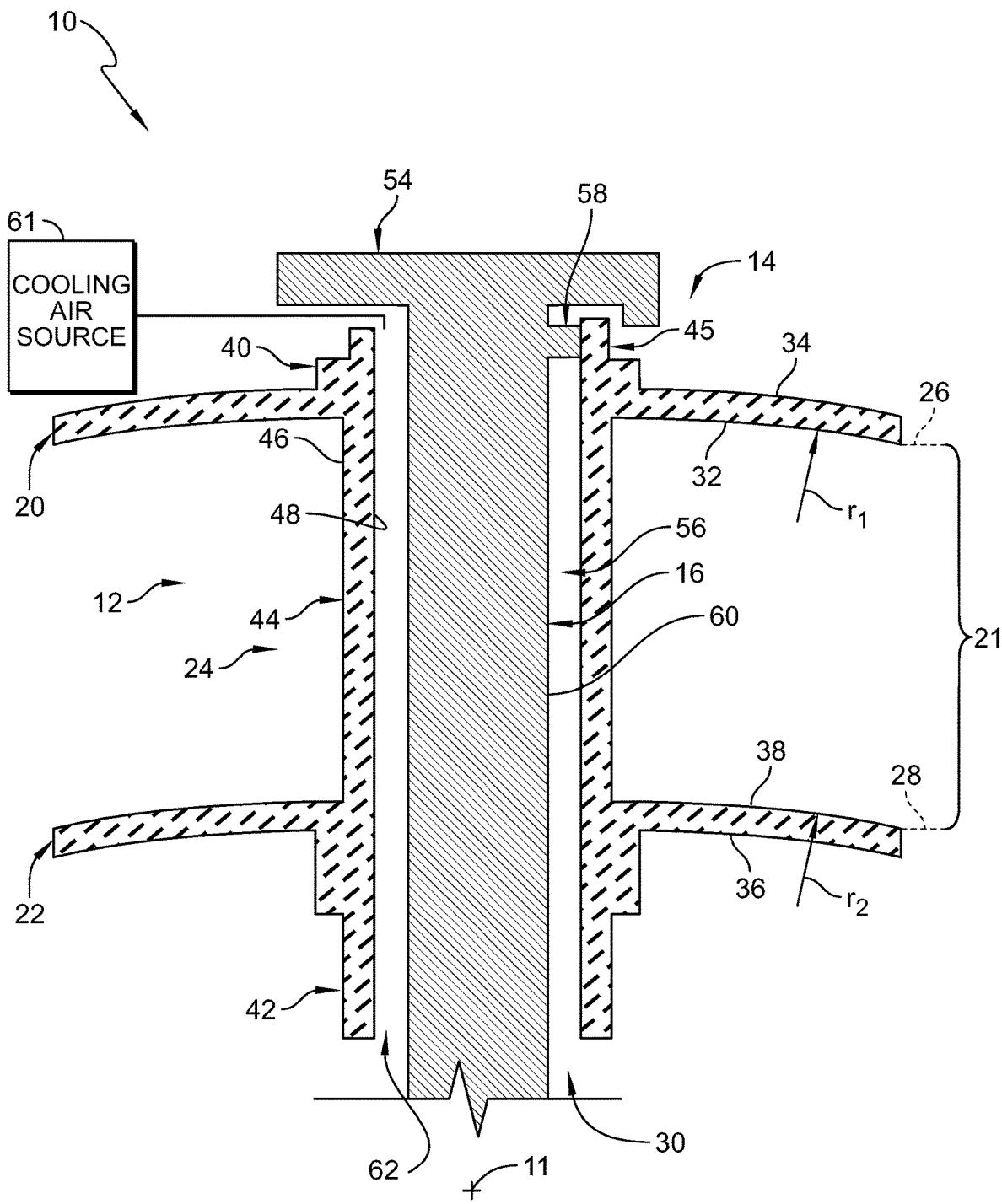
FIG. 4 is a cross-sectional view of the turbine vane assembly of FIG. 1 taken along line 4-4 showing that the support strut is spaced apart from the turbine vane to form a cooling channel between the support strut and the turbine vane and showing that the outermost surface of the support strut extends along the entire length of a gas path in the cooling channel.

The vane 12 extends circumferentially partway about an axis 11 and radially outward away from the axis 11 as shown in FIG. 4. The vane 12 includes an outer wall 20, an inner wall 22, and an aerofoil 24 as shown in FIGS. 1 and 4. The outer wall 20 defines the outer boundary 26 of the primary gas path 21. The inner wall 22 is spaced apart radially from the outer wall 20 relative to the axis 11 to define the inner boundary 28 of the primary gas path 21. The aerofoil 24 extends radially between and interconnects the outer wall 20 and the inner wall 22. The aerofoil 24 is shaped to redirect gases flowing through the primary gas path 21 and shield the support strut 14 from the hot gases in the primary gas path 21. The aerofoil 24 is also formed to define the interior cavity 30 that extends radially into the aerofoil 24 as shown in FIG. 4.

In the illustrative embodiment, the outer wall 20, the inner wall 22, and the aerofoil 24 of the vane 12 are integrally formed from ceramic matrix composite materials. As such, the outer wall 20, the inner wall 22, and the aerofoil 24 provide a single, integral, one-piece vane component 12 as shown in FIG. 4. In other embodiments, the outer wall 20, the inner wall 22, and the aerofoil 24 may be formed as separate components.

The outer wall 20 includes a radial inner surface 32 that defines the outer boundary 26 of the primary gas path 21 and a radial outer surface 34 as shown in FIG. 4. The radial inner surface 32 is located at a first radius r1 relative to the axis 11 and faces the primary gas path 21. The radial outer surface 34 is spaced apart radially from the radial inner surface 32 and faces away from the primary gas path 21.

The inner wall 22 includes a radial inner surface 36 and a radial outer surface 38 that defined the inner boundary 28 of the primary gas path 21 as shown in FIG. 4. The radial outer surface 38 is located at a second radius r2 relative to the axis 11 and faces the primary gas path 21. The radial inner surface 36 is spaced apart from the radial outer surface 38 and faces away from the primary gas path 21.

The aerofoil 24 includes a radial outer end 40, a radial inner end 42, and a body 44 as shown in FIG. 4. The radial outer end 40 extends radially-outwardly past the outer wall 20 beyond the first radius r1, or the outer boundary 26, and outside the primary gas path 21 in the illustrative embodiment. The radial inner end 42 is spaced apart from the radial outer end 40 relative to the axis 11 and extends radially-inwardly past the inner wall 22 beyond the second radius r2, or the inner boundary 28, and outside the primary gas path 21. The body 44 extends radially entirely between the first radius r1 and the second radius r2 and interconnects the radial outer end 40 and the radial inner end 42.

The radial outer end 40 of the aerofoil 24 provides a load transfer region 45 as shown in FIG. 4. The load transfer region 45 is located radially outward of the outer boundary 26 outside of the primary gas path 21 in the illustrative embodiment. In other embodiments, the load transfer region 45 is located radially inward of the inner boundary 28 outside the primary gas path 21. The load transfer region 45 is contacted by a load transfer tab 58 of the support strut 14 to transfer loads applied to the vane 12 to the support strut 14 at the radial outer end 40 of the aerofoil 24 outside of the primary gas path 21.

The aerofoil 24 also includes an outer surface 46 and an interior surface 48 as shown in FIG. 3. The outer surface 46 interacts with the gases in the primary gas path 21 and extends between the radial inner surface 32 of the outer wall 20 and the radial outer surface 38 of the inner wall 22. The interior surface 48 is spaced apart from the outer surface 46 and defines the interior cavity 30 that extends radially through the aerofoil 24. The outer surface 46 and the interior surface 48 are continuous and formed without holes in the illustrative embodiment. In other embodiments, the outer surface 46 and the interior surface 48 are formed with holes that fluidly connect the interior cavity 30 with the primary gas path 21.

The outer surface 46 of the aerofoil 24 defines a leading edge 50, a trailing edge 51, a pressure side 52, and a suction side 53 of the vane 12 as shown in FIG. 2. The trailing edge 51 is axially spaced apart from the leading edge 50. The suction side 53 is circumferentially spaced apart from the pressure side 52. The pressure side 52 and the suction side 53 extend between and interconnect the leading edge 50 and the trailing edge 51.

The support strut 14 includes an outer mount panel 54, a spar 56, and the load transfer tab 58 as shown in FIG. 4. The outer mount panel 54 is configured to couple the turbine vane assembly 10 with a casing or carrier of a gas turbine engine. The spar 56 extends radially-inwardly from the outer mount panel 54 relative to the axis 11 and into the interior cavity 30 of the vane 12. The load transfer tab 58 extends circumferentially away from the spar 56 relative to the axis 11 and engages the load transfer region 45 of the aerofoil 24 at a location radially outward of the first radius r1, or the outer boundary 26, and outside the primary gas path 21 in the illustrative embodiment. In other embodiments, the load transfer tab may be located radially inward of the second radius r2, or the inner boundary 28, outside the primary gas path 21. The outer mount panel 54 may couple the support strut 14 with an engine case of the gas turbine engine. Additional load transfer tabs may be included and spaced apart radially to engage other regions of the aerofoil 24.

In the illustrative embodiment, the outer mount panel 54, the spar 56, and the load transfer tab 58 are integrally formed from metallic materials such that the outer mount panel 54, the spar 56, and the load transfer tab 58 provide a single, integral, one-piece solid support strut 14 component as shown in FIGS. 2-4. In other embodiments, the outer mount panel 54, the spar 56, and the load transfer tab 58 may be formed as separate components.

In the illustrative embodiments, the spar 56 of the support strut 14 is spaced apart from the aerofoil 24 at all locations radially between the outer boundary 26 and the inner boundary 28 of the primary gas path 21 to define an cooling channel 62 between the support strut 14 and the aerofoil 24 as shown in FIG. 4. The outermost surface 16 of the spar 56 extends entirely circumferentially and axially around the spar 56 and radially along the spar 56 of the support strut 14.

In the illustrative embodiment, the spar 56 is solid and formed without pores or holes. As such, the outermost surface 16 is solid and formed without radially, axially, or circumferentially extending holes. In some embodiments, the spar 56 may be hollow to allow flow of cooling air through the spar 56 and transmit cooling air into an inter-disk cavity. In some embodiments, the spar 56 is formed to include holes to allow fluid to pass from inside the hollow spar 56 and into the cooling channel 62 and/or transmit cooling air to the vane 12.

In some embodiments, an internal cavity forming the hollow spar 56 may have an interior surface with a reduced surface roughness. The reduced surface roughness on the internal surface of the spar 56 may also minimize the heat pick-up of the spar 56.

The outermost surface 16 faces the interior surface 48 of the aerofoil 24 in the cooling channel 62 and is spaced apart from the aerofoil 24 as shown in FIG. 4. The surface roughness 60 of the outermost surface 16 is relatively low to reduce the amount of radiant heat transferred from the vane 12 to the support strut 14.

The surface roughness 60 of the outermost surface 16 may reduce the amount of radiant and convective heat transferred from the vane 12 to the support strut 14. In some embodiments, the surface roughness 60 of the outermost surface 16 may reduce the amount of conductive heat transferred from the vane 12 to the support strut 14 while in some embodiments conductive heat transfer is addressed with structural design choices.

In the illustrative embodiment, the continuous outermost surface 16 has a surface roughness 60 that has a high reflectivity and a low or no transmissivity and low or no emissivity. The combination of the reflectivity, emissivity, and transmissivity of a surface is equal to 1. The reflectivity is the proportion of heat (radiation) reflected and therefore not absorbed by the surface, the transmissivity is the amount passed through the surface and continues through the coating contributing to the heating of the component feature to be protected, and the emissivity is the proportion absorbed and re-radiated back out.

In the illustrative embodiment, the surface roughness 60 of the outermost surface 16 is equal to about 2 μm Ra or less. In other embodiments, the surface roughness 60 of the outermost surface 16 is equal to about 1 μm Ra or less. In other embodiments, the outermost surface 16 has a surface roughness 60 equal to about 1 μm Ra to about 2 μm Ra.

In some embodiments, the outermost surface 16 has a surface roughness 60 in the range of about 0.8 μm Ra to about 2 μm Ra. In some embodiments, the continuous outermost surface 16 has a surface roughness 60 in the range or about 1.0 μm Ra to about 1.8 μm Ra. In some embodiments, the outermost surface 16 has a surface roughness 60 of about 1.8 μm Ra or less. In some embodiments, the outermost surface 16 has a surface roughness 60 of about 0.8 μm Ra or less.

In some embodiments, the outermost surface 16 has a surface roughness 60 in the range of about 1.6 μm Ra to about 0.1 μm Ra. In some embodiments, the outermost surface 16 has a surface roughness 60 in the range of about 0.8 μm Ra to about 0.2 μm Ra. The outermost surface 16 has a surface roughness 60 in the range of about 0.8 μm Ra to about 0.1 μm Ra in some embodiments.

In some embodiments, the outermost surface 16 has a surface roughness 60 in the range of about 0.75 μm Ra to about 0.2 μm Ra. In some embodiments, the outermost surface 16 has a surface roughness 60 in the range of about 0.4 μm Ra to about 0.1 μm Ra. The outermost surface 16 has a surface roughness 60 in the range of about 0.4 μn Ra to about 0.05 μn Ra in some embodiments. In some embodiments, the outermost surface 16 has a surface roughness 60 in the range of about 0.8 μm Ra to about 0.4 μm Ra. In some embodiments, the outermost surface 16 has a surface roughness 60 of about 6.3 μm Ra or less. In other embodiments, the outermost surface 16 has a surface roughness 60 in the range of about 1 μm Ra to about 6.3 μm Ra. The outermost surface 16 has a surface roughness 60 in the range of about 2 μm Ra to about 6.3 μm Ra in some embodiments. In some embodiments, the outermost surface 16 has a surface roughness 60 in the range of about 1.6 μm Ra to about 6.3 μm Ra.

In some embodiments, the outermost surface 16 has a surface roughness of between about 0.025 μm Ra and about 12.5 μm Ra. In some embodiments, the outermost surface 16 has a surface roughness of between about 0.025 μm Ra and about 6.3 μm Ra. In some embodiments, the outermost surface 16 has a surface roughness of between about 0.05 μm Ra and about 6.3 μm Ra. In some embodiments, the outermost surface 16 has a surface roughness of between about 0.05 μm Ra and about 3.2 μm Ra. In some embodiments, the outermost surface 16 has a surface roughness of between about 0.1 μm Ra and about 6.3 μm Ra. In some embodiments, the outermost surface 16 has a surface roughness of between about 0.1 μm Ra and about 3.2 μm Ra. In some embodiments, the outermost surface 16 has a surface roughness of between about 0.2 μm Ra and about 1.6 μm Ra. In some embodiments, the outermost surface 16 has a surface roughness of between about 0.2 μm Ra and about 3.2 μm Ra. In some embodiments, the outermost surface 16 has a surface roughness of between about 0.2 μm Ra and about 6.3 μm Ra.

In some embodiments, the outermost surface 16 has a reflectivity between about 0.3 and about 1.0. In some embodiments, the outermost surface 16 has a reflectivity of about 0.4 or more. In some embodiments, the outermost surface 16 has a reflectivity in the range of about 0.4 to about 1.0. In some embodiments, the outermost surface 16 has a reflectivity in the range of about 0.35 to about 1.0. In some embodiments, the outermost surface 16 has a reflectivity in a range of about 0.5 to about 1.0. In some embodiments, the outermost surface 16 has a reflectivity of about 0.5 to about 1.0.

In some embodiments, the outermost surface 16 has a reflectivity of about 0.05 to about 0.95. In some embodiments, the outermost surface 16 has a reflectivity of about 0.1 to about 0.95. In some embodiments, the outermost surface 16 has a reflectivity of about 0.2 to about 0.95. In some embodiments, the outermost surface 16 has a reflectivity of about 0.1 to about 0.9. In some embodiments, the outermost surface 16 has a reflectivity of about 0.1 to about 0.8. In some embodiments, the outermost surface 16 has a reflectivity of about 0.3 to about 0.95. In some embodiments, the outermost surface 16 has a reflectivity of about 0.3 to about 0.9. In some embodiments, the outermost surface 16 has a reflectivity of about 0.3 to about 0.85.

In some embodiments, the outermost surface 16 has a reflectivity of about 0.4 to about 0.9. In some embodiments, the outermost surface 16 has a reflectivity of about 0.4 to about 0.95. In some embodiments, the outermost surface 16 has a reflectivity of about 0.4 to about 0.8. In some embodiments, the outermost surface 16 has a reflectivity of about 0.5 to about 0.95. In some embodiments, the outermost surface 16 has a reflectivity of about 0.5 to about 0.9. In some embodiments, the outermost surface 16 has a reflectivity of about 0.5 to about 0.85. In some embodiments, the outermost surface 16 has a reflectivity of about 0.5 to about 0.8. In some embodiments, the outermost surface 16 has a reflectivity of about 0.5 to about 0.75.

In some embodiments, the outermost surface 16 has a reflectivity between about 0.6 and about 1.0. In some embodiments, the outermost surface 16 has a reflectivity of about 0.7 or more. In some embodiments, the outermost surface 16 has a reflectivity in a range of about 0.7 to about 1.0. In some embodiments, the outermost surface 16 has a reflectivity in a range of about 0.75 to about 1.0. In some embodiments, the outermost surface 16 has a reflectivity in a range of about 0.8 to about 1.0. In some embodiments, the outermost surface 16 has a reflectivity of about 0.9 to about 1.0.

In some embodiments, the outermost surface 16 has a reflectivity in a range of about 0.7 to about 0.95. In some embodiments, the outermost surface 16 has a reflectivity in a range of about 0.65 to 0.95. In some embodiments, the outermost surface 16 has a reflectivity in a range of about 0.7 to about 0.9. In some embodiments, the outermost surface 16 has a reflectivity between about 0.75 and about 0.95. In some embodiments, the outermost surface 16 has a reflectivity between about 0.8 and about 0.95. In some embodiments, the outermost surface 16 has a reflectivity between about 0.75 and about 0.9. In some embodiments, the outermost surface 16 has a reflectivity between about 0.8 and about 0.9. In some embodiments, the outermost surface 16 has a reflectivity between about 0.6 and about 0.7. In some embodiments, the outermost surface 16 has a reflectivity between about 0.7 and about 0.85. In some embodiments, the outermost surface 16 has a reflectivity between about 0.7 and about 0.9.

In some embodiments, the outermost surface has a reflectivity of about 0.6. In some embodiments, the outermost surface has a reflectivity of about 0.65. In some embodiments, the outermost surface has a reflectivity of about 0.7. In some embodiments, the outermost surface has a reflectivity of about 0.75. In some embodiments, the outermost surface has a reflectivity of about 0.80. In some embodiments, the outermost surface has a reflectivity of about 0.85. In some embodiments, the outermost surface has a reflectivity of about 0.9. In some embodiments, the outermost surface has a reflectivity of about 0.95.

In some embodiments, the outermost surface has a reflectivity of about 0.3. In some embodiments, the outermost surface has a reflectivity of about 0.35. In some embodiments, the outermost surface has a reflectivity of about 0.4. In some embodiments, the outermost surface has a reflectivity of about 0.45. In some embodiments, the outermost surface has a reflectivity of about 0.50. In some embodiments, the outermost surface has a reflectivity of about 0.55.

In the illustrative embodiment, the outermost surface 16 is spaced apart from aerofoil 24 of the vane 12 at all locations radially between the outer boundary 26 and the inner boundary 28 of the primary gas path 21 as shown in FIG. 4. As such, the outermost surface 16 is spaced apart from the interior surface 48 of the aerofoil at all locations between the first radius r1 and the second radius r2. As such, the low surface roughness 60 of the continuous outermost surface 16 extends radially along the cooling channel 62 at all locations between the first radius r1 and the second radius r2.

Additionally, the surface roughness 60 of the outermost surface 16 extends radially entirely between the radial inner surface 32 of the outer wall 20 and the radial outer surface 38 of the inner wall 22. In the illustrative embodiment, the surface roughness 60 of the outermost surface 16 extends radially outward beyond the radial inner surface 32 of the outer wall 20 and radially inward of the radial outer surface 38 of the inner wall 22. The surface roughness of the surface 16 extending radially outward of the outer boundary 26 and inward of the inner boundary 28 is greater than the surface roughness of the surface 16 located radially between the outer boundary 26 and the inner boundary 28 in some embodiments.

In the illustrative embodiment, the cooling channel 62 is supplied cooling air from a cooling air source 61. The cooling air source 61 may be pressurized air from the upstream compressor. In other embodiments, the cooling air source 61 may be other suitable sources within the gas turbine engine.

In the illustrative embodiment, cooling air is the only component or substance located in the cooling channel 62 radially between the radial outer boundary 26 and the radial inner boundary 28. In other embodiments, other components may be located in the cooling channel 62 between the radial outer boundary 26 and the radial inner boundary 28.

In the illustrative embodiment, the outermost surface 16 extends to and along the load transfer tab 58 of the support strut 14. The outermost surface 16 extending to and along the load transfer tab 58 has the surface roughness 60 to reduce the radiative and convective heating to the load transfer tab 58 and the aerofoil 24 so that the load transfer tab 58 of the support strut 14 is shielded from the radiant and convective heating.

A method of making the turbine vane assembly 10 may include several steps. The method includes providing the metallic support strut 14 having the outermost surface 16 and the ceramic matrix composite aerofoil 24 formed to define the interior cavity 30 therein. The method includes locating the metallic support strut 14 in the interior cavity 30 so that at least a portion of continuous outermost surface 16 of the metallic support strut 14 is spaced apart from the ceramic matrix composite aerofoil 24 to define the cooling channel 62 therebetween. The method may include supplying the cooling channel 62 with a flow of cooling air from the cooling air source 61. The method may include a machining step in which the support strut or coating layer of the support strut is machined to provide the smooth surface with a low surface roughness. The machining step may include polishing, grinding, cutting, or any other suitable alternative.

The method may further include polishing at least a portion of the outermost surface 16 of the metallic support strut 14 so that the outermost surface 16 has a surface roughness 60 of about 2 μm Ra or less to reduce the heat transfer coefficient and increase surface reflectivity of the outermost surface of the metallic support strut 14. The polishing step may include electro-polishing, superfinishing, or another suitable form of polishing.

The method may include grinding at least a portion of the outermost surface 16 of the metallic support strut 14 so that the outermost surface 16 has the desired surface roughness 60. The grinding step may include electrolytic grinding, barrel finishing, or another suitable form of grinding, such as honing, lapping, etc.

The method may also include cutting at least a portion of the outermost surface 60 of the metallic support strut 14 so that the outermost surface 60 has the desired surface roughness 60. The cutting step may include laser cutting, electro-beam cutting, or another suitable form of cutting.

Figure 5:
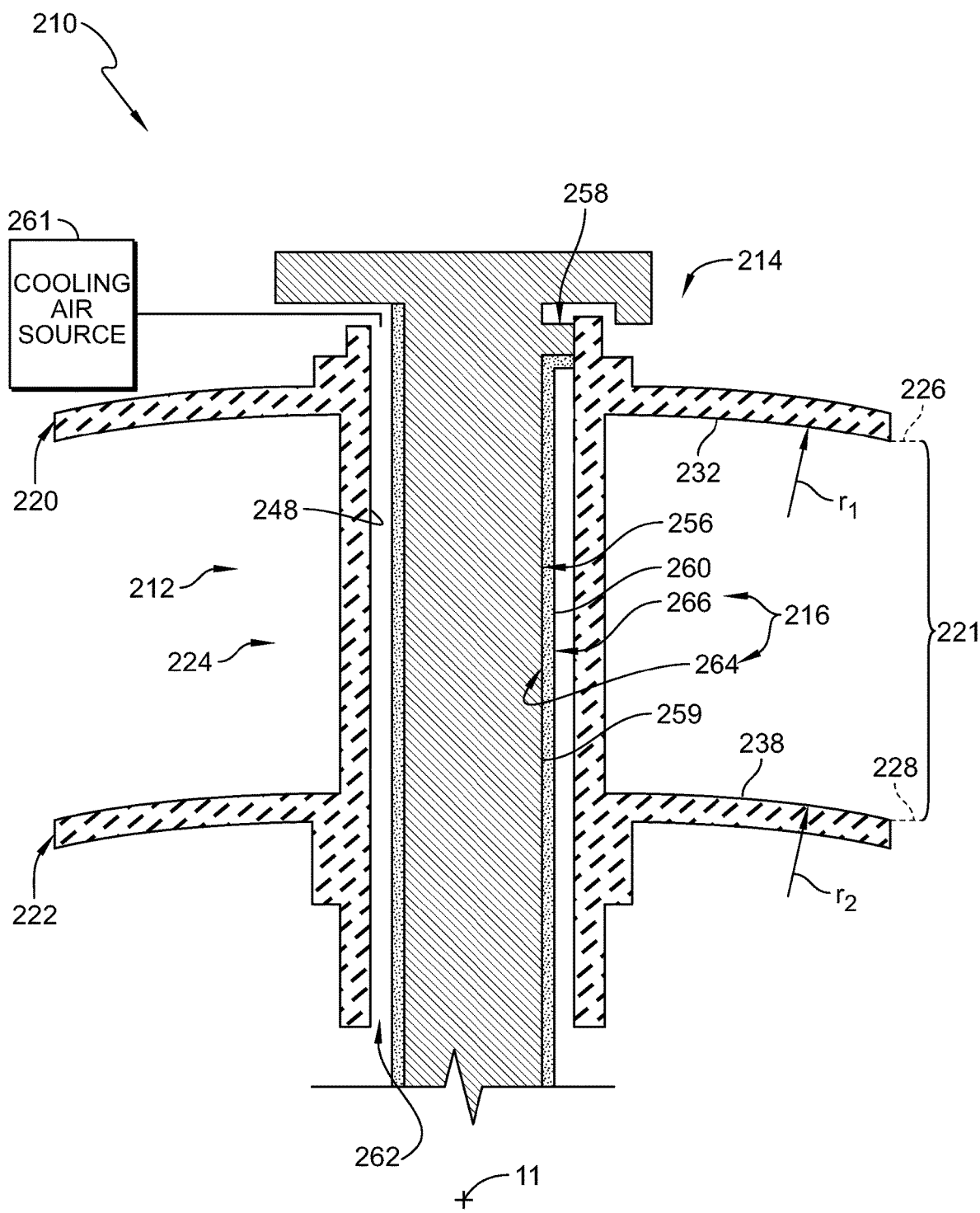
FIG. 5 is cross-sectional view of another turbine vane assembly in accordance with the present disclosure showing that the turbine vane assembly includes a turbine vane adapted to interact with hot gases and a support strut that includes a smooth outermost layer that faces the turbine vane.

Another embodiment of a turbine vane assembly 210 in accordance with the present disclosure is shown in FIG. 5. The turbine vane assembly 210 is substantially similar to the turbine vane assembly of FIGS. 1-4 and described herein. Accordingly, similar reference numbers in the 200 series indicated features that are common between the turbine vane assembly 10 and the turbine vane assembly 210. The description of the turbine vane assembly 10 is incorporated by reference to apply to the turbine vane assembly 210, except in instances when it conflicts with the specific description and the drawings of the turbine vane assembly 210.

The turbine vane assembly 210 extends partway about the axis 11 and is adapted for use in a gas turbine engine. The turbine vane assembly 210 includes a vane 212 and a support strut 214 as shown in FIG. 5. The support strut 214 has a outermost surface 216 that faces an aerofoil 224 of the turbine vane 212 and extends radially between an outer boundary 226 and an inner boundary 228 of the primary gas path 221 in a cooling channel 262 formed between the vane 212 and the strut 214. In the illustrative embodiment, the outermost surface 216 forms an additional layer applied to a spar 256 of the support strut 214. The outermost surface 216 has a surface roughness 260 to increase the reflectivity of the outermost surface 216 of the support strut 214 to reduce an amount of radiant and convective heat transfer to the support strut 214 from the vane 212 caused by a temperature difference between the vane 212 and the support strut 14 during use of the assembly 210.

The outermost surface 216 is provided by a coating layer applied to the spar 256. The coating layer may be applied to the spar 256 before any machining is performed on the support strut 214 to achieve the desired surface roughness. In some embodiments, the coating layer has a desired surface roughness without a machining step.

The outermost surface 216 includes an attachment surface 264 and a shield surface 266 as shown in FIG. 5. The attachment surface 264 is coupled to an external surface 259 of the spar 256 included in the strut 214. The shield surface 266 is spaced apart from the attachment surface 264 and faces away from the external surface 259 of the spar 256 towards an interior surface 248 of the aerofoil 224. The shield surface 266 is spaced apart from the interior surface 248 of the aerofoil 224.

In the illustrative embodiment, the cooling channel 262 is supplied with cooling air from a cooling air source 261. The cooling air source 261 may be pressurized air from the upstream compressor. In other embodiments, the cooling air source 261 may be other suitable sources within the gas turbine engine.

Additionally, the outermost surface 216 extends radially entirely between a radial inner surface 232 of an outer wall 220 of the vane 212 and a radial outer surface 238 of an inner wall 222 of the vane 212. In the illustrative embodiment, the outermost surface 216 extends radially outward beyond the radial inner surface 232 of the outer wall 220 and radially inward of the radial outer surface 238 of the inner wall 222.

In the illustrative embodiment, a portion of the outermost surface 216 extends to and shields the load transfer tab 258 of the support strut 214. The outermost surface 216 covers a load transfer tab 258 of the support strut 214 to reduce the radiative and convective heating to the load transfer tab 258 and the aerofoil 224 so that the load transfer tab 258 of the support strut 214 is shielded from the radiant and convective heating.

The present disclosure relates to methods to reduce radiative and convective heat transfer to the metallic spar 56 used in a ceramic matrix composite (CMC) nozzle guide vane assembly 10, for example, in the second stage high-pressure turbine. In illustrative embodiments, the outermost surface 16 is formed between the ceramic matrix composite vane 12 and metal surfaces of the support strut 14 with high reflectivity to shield the metal from the radiative heating effect. A low emissivity coating may be applied to the spar 56 to shield the metal from the radiative heating effect in some embodiments.

The relatively smooth outermost surface 16 will increase the reflectively while also reducing the heat transfer coefficient. The smooth outermost surface 16 may reduce the turbulence of a flow of cooling air in the cooling channel 61 and therefore reducing the heat mixing in the boundary layer.

In instances when the ceramic matrix composite material needs convective cooling, the support strut 14 may need to be isolated from the fluid as it heats before exiting the ceramic matrix composite structure. A thermal barrier coating (TBC) may be applied to the spar 56 to convectively cool the metal structure. The metal roughness 60 of the outermost surface 16 of the spar 56 may be reduced to minimize the heat transfer coefficient and increase convective cooling. In such embodiments, the spar 56 may be free of any coating or shield. The CMC-metal cavity may be designed to avoid accelerating the fluid.

In some embodiments, the Mach number and/or the velocity of the flow of cooling air in the cooling channel 61 may be minimized to avoid accelerating the flow of cooling air and minimize the heat transfer coefficient. Reducing the turbulence in the flow therefore reduces the heat mixing in the boundary layer between the outermost surface 16 and the flow of cooling air.

In other embodiments, the vanes are metallic and do not need sparred supports and therefore do not need CMC cooling. However, the CMC cooling requirements may depend on the material temperature capability and engine cycle design.

Ceramic matrix composite materials may offer a higher temperature capability than conventional nickel based superalloys used in gas turbine engines. The ceramic matrix composite material may allow for a reduction in cooling air flow used and consequently an increase in thermal efficiency and therefore reduced fuel burn.

One component which may benefit from the substitution of nickel based superalloy with ceramic matrix composite materials in the second stage high pressure turbine nozzle guide vane. The vanes need to support an inter-stage seal and due to the relatively low strength of SiC/SiC ceramic matrix composite materials, a metallic support structure or spar may be used to transmit the axial loading applied to the inter-stage seal to the high-pressure turbine casing. Metallic nozzle guide vanes may be able to withstand the loading associated with the inter-stage seal loading without the need for a dedicated structure.

As the temperature capability of the ceramic matrix composite material increases the integrity and durability of the metallic support structure may decrease. The strength of the metal may reach a break-point where the material is insufficiently capable of tolerating the stresses. Additionally, the modulus of the metal structure decreases with temperature and drives a larger deflection relative to the ceramic matrix composite material, potentially overloading the ceramic matrix composite structure.

Regardless of the ceramic matrix composite material capability, there may be a non-trivial radiative heat load that is inputted to the metallic spar. The radiative heat load may increase exponentially with ceramic matrix composite operating temperature. The exponentially increasing radiative heat load may be an issue in the high pressure stage 2 turbine application, as the metal structure exists wholly within the very hot ceramic matrix composite structure and thus attracts a relatively large view factor.

A low emissivity coating applied to the support strut 14 may be an explicit coating or doping of the thermal barrier coating, e.g. Gadolinium to form Gadolinium Oxide or other oxide forming species. Alternatively, a low emissivity coating may be a surface treatment applied to the spar 56 to increase its reflectivity, e.g. polishing.

In some embodiments, a thermal barrier shield is a high-temperature capability thermal barrier coating with alloying additions to control transmission of optical and infrared wavelengths and to lower the thermal conductivity of the layer. In some embodiments, the alloying additions may include Gadolinium While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly for a gas turbine engine, the turbine vane assembly comprising
    a ceramic matrix composite vane adapted to conduct hot gases flowing through a primary gas path of the gas turbine engine around the turbine vane assembly during use of the turbine vane assembly, the ceramic matrix composite vane includes an outer wall that defines an outer boundary of the primary gas path, an inner wall spaced apart radially from the outer wall relative to an axis to define an inner boundary of the primary gas path, and an aerofoil that extends radially between and interconnects the outer wall and the inner wall, and the aerofoil formed to define an interior cavity that extends radially into the aerofoil, and
    a metallic support strut located in the interior cavity formed in the aerofoil and configured to receive force loads applied to the ceramic matrix composite vane by the hot gases during use of the turbine vane assembly, the metallic support strut being spaced apart from the aerofoil at all locations radially between the outer boundary and the inner boundary of the primary gas path to define a cooling channel between the metallic support strut and the aerofoil,
    wherein the metallic support strut has an outermost surface that faces the aerofoil and extends radially between the inner boundary and the outer boundary of the primary gas path in the cooing channel and the outermost surface has a surface roughness of about 6.3 µm Ra or less to provide the metallic support strut with a reflectivity to reduce an amount of radiant and convective heat transfer to the metallic support strut from the ceramic matrix composite vane caused by a temperature difference between the ceramic matrix composite vane and the metallic support strut during use of the turbine vane assembly.

2. The turbine vane assembly of claim 1, wherein the cooling channel is filled entirely by fluid radially between the outer boundary and the inner boundary.

3. The turbine vane assembly of claim 1, wherein the metallic support strut further includes a spar that extends radially into the interior cavity and a load transfer tab that extends circumferentially away from the spar and engages the aerofoil to receive the force loads applied to the ceramic matrix composite vane by the hot gases during use of the turbine vane assembly.

4. The turbine vane assembly of claim 3, wherein the load transfer tab is located radially outward of the outer boundary.

5. The turbine vane assembly of claim 3, wherein the load transfer tab is located radially inward of the inner boundary.

6. The turbine vane assembly of claim 1, wherein the outermost surface of the metallic support strut has a first surface roughness radially between the outer boundary and the inner boundary and a second surface roughness radially outward of the outer boundary and the second surface roughness is different than the first surface roughness.

7. The turbine vane assembly of claim 1, wherein the surface roughness of the outermost surface of the metallic support strut is about 2 µm Ra or less radially outward beyond the outer boundary and radially inward beyond the inner boundary.

8. The turbine vane assembly of claim 1, wherein the metallic support strut includes a spar and a coating layer applied to the spar and the coating layer forms the outermost surface.

9. The turbine vane assembly of claim 1, wherein the outermost surface of the metallic support strut is continuous and formed without holes and the surface roughness of the outermost surface is about 1.6 µm Ra or less.

10. A turbine vane assembly for a gas turbine engine, the turbine vane assembly comprising
    a vane that extends radially relative to an axis and the vane formed to define an interior cavity therein and
    a support strut located in the interior cavity and at least a portion of the support strut being spaced apart from the vane to define a radially extending cooling channel between the support strut and the vane,
    wherein the support strut has an outermost surface located in the cooling channel, the outermost surface is spaced apart from and faces the vane and at least a portion of the outermost surface has a surface roughness of about 6.3 µm Ra or less.

11. The turbine vane assembly of claim 10, wherein the outermost surface of the support strut is continuous and formed without holes that extend through the outermost surface of the support strut.

12. The turbine vane assembly of claim 10, wherein the support strut and the outermost surface are formed as a single, integral, one-piece component.

13. The turbine vane assembly of claim 10, wherein the support strut includes a spar and a coating layer applied to the spar and the coating layer forms the outermost surface.

14. The turbine vane assembly of claim 10, wherein the vane includes an outer wall having a radial inner surface, an inner wall having a radial outer surface, and an aerofoil that extends radially between and interconnects the outer wall and the inner wall.

15. The turbine vane assembly of claim 14, wherein the outer wall defines a radial outer boundary of a gas path, the inner wall defines a radial inner boundary of the gas path, and the outermost surface of the support strut has a first surface roughness radially between the radial outer boundary and the radial inner boundary and a second surface roughness radially inward of the radial inner boundary and the second surface roughness is different than the first surface roughness.

16. The turbine vane assembly of claim 15, wherein the outermost surface of the support strut is continuous and formed without holes that extend through the outermost surface of the support strut.

17. The turbine vane assembly of claim 14, wherein the outer wall defines a radial outer boundary of a gas path, the inner wall defines a radial inner boundary of the gas path, and the cooling channel is filled entirely by fluid radially between the radial outer boundary and the radial inner boundary.

18. A method comprising
providing a metallic support strut and a ceramic matrix composite aerofoil formed to define an interior cavity therein,
machining the metallic support strut so that at least a portion of an outermost surface of the metallic support strut has a surface roughness of about 6.3 μm Ra or less to increase surface reflectivity of the at least the portion of the outermost surface of the metallic support strut, and
locating the metallic support strut in the interior cavity of the ceramic matrix composite aerofoil so that the at least the portion of the outermost surface of the metallic support strut is spaced apart from the ceramic matrix composite aerofoil to define a cooling channel therebetween.

19. The method of claim 18, further comprising applying a coating to the metallic support strut to provide the outermost surface before the machining step.

20. The method of claim 18, wherein in the machining step includes one of polishing, grinding, and cutting the metallic support strut.

\* \* \* \* \*